Patented Feb. 17, 1942

2,273,046

UNITED STATES PATENT OFFICE 2,273,046

PROCESS FOR RECOVERING STEROLS

Percy L. Julian, Maywood, and John Wayne Cole, Chicago, Ill., assignors to The Glidden Company, Cleveland, Ohio, a corporation of Ohio No Drawing. Application July 8, 1940, Serial No. 344,385

11 Claims. (Cl. 260—397.2)

The present invention relates to the recovery of sterols.

In the recovery of sterols from animal and vegetable matter containing the same it is customary to take up the sterols in a solvent from a suitably prepared concentrate of the sterols and to purify the sterols by crystallization. Among the concentrates which are suitable may be mentioned concentrated extracts obtained from soaps, tar residues from the distillation of fatty acids and concentrated extracts thereof containing the sterols, the low oil concentrate obtained by adsorption of oils such as soybean oil with suitable adsorbents, the lower boiling fractions obtained by molecular distillation of soybean oil containing large amounts of unsaponifiables, and other concentrates of unsaponifiables.

These concentrates in addition to sterols may contain one or more of such impurities as the following: other unsaponifiables, oils, soaps, phosphatides and pigment impurities. In taking up the sterols these impurities are dissolved, and upon crystallization of the sterols from the usual solvents used, some of these impurities also separate from the liquor and are adsorbed onto or otherwise contaminate the sterols. Thus even though the sterols are readily and easily crystallized, several recrystallizations are required to remove these impurities. It has been found that these impurities are much more soluble in concentrated (75%–100%) acetic acid than the sterols themselves. This is not true of other solvents such as ether or alcohol.

Example I

Dry porous lime soap of soybean oil such as described in application Serial No. 266,408, filed April 6, 1939, was extracted with acetone, and the extract concentrated by evaporation in the presence of barium hydroxide to a syrupy mass. 10 gallons of this syrup was then taken up in 3.5 gallons of hot glacial acetic acid. This solution was then set aside to cool at a temperature of about 65–75° F.

Large crystals formed which were readily filtered or centrifuged from the bulk of the mother liquor. These crystals were washed with methyl alcohol, and about ten pounds of practically colorless crystals of soybean sterols recovered which were suitable for conversion into sex hormones or for use for any other desired purpose. Ethyl alcohol or other suitable washing agent may be used in place of methyl alcohol. These crystals showed an optical rotation of 20°–29° (in chloroform) and melted 131°–133° C.

Example II

In place of using acetone in the extraction of the soap, methyl ethyl ketone, ether, isopropyl ether, dioxan, benzene, or similar organic solvents may be used, and the extract concentrated by evaporation. The concentrate may be dissolved in hot glacial acetic acid and the sterols crystallized therefrom.

Example III

In place of using the porous lime soap made from soybean oil for the preparation of the sterol-bearing extract, other porous soaps may be used such as those made from cottonseed oil, from cottonseed oil foots, from soybean oil foots, and from concentrates such as the material absorbed from vegetable oils according to U. S. Patent No. 2,174,177. The concentrated extract from any of these soaps is dissolved in hot glacial acetic acid and the sterols crystallized therefrom.

Example IV

In place of soap the material adsorbed from soybean oil by means of an adsorbent prepared according to United States Patent No. 2,174,177 together with adsorbent, may be extracted with suitable solvents such as acetone, ether, petroleum ether, ethylene dichloride, benzene, etc. The extract may then be concentrated and thereafter the procedure of Example I may be followed. If acetone is used the phosphatides are not extracted and the residue may again be extracted with suitable solvents to recover the phosphatides. If solvents which extract the phosphatides are used, such as ether, the mother liquor remaining after the crystallization of the sterols may be treated to recover the phosphatides therefrom.

It will be apparent to those skilled in the art that modifications may be made without departing from the spirit of the invention, and that other materials than those specifically mentioned may be treated. Any material containing the sterols, preferably as concentrated as is feasible, and containing impurities such as other unsaponifiables, soap, oil, phosphatides, pigment impurities, etc., may be employed.

Having described our invention what is claimed and desired to be secured by Letters Patent of the United States is:

1. In a process for recovering sterols the steps comprising treating a concentrate containing sterols and impurities selected from the class consisting of other unsaponifiable organic matter, oil, phosphatides, soap and pigment impurities with heated glacial acetic acid to dissolve the sterols and the impurities, and cooling the solution to crystallize the sterols from the solution.

2. In a process for recovering sterols the steps comprising treating a concentrate containing sterols and impurities selected from the class consisting of other unsaponifiable organic matter, soap, oil, phosphatides, and pigment impurities with heated acetic acid of 75% to 100% concentration to dissolve the sterols and the impurities and cooling the solution to crystallize the sterols from solution.

3. In a process for recovering sterols the steps comprising taking up a liquid concentrate containing the sterols and impurities in heated glacial acetic acid, cooling the solution thus formed to crystallize the sterols, and recovering the crystals from the mother liquor.

4. In a process for recovering soybean sterols the steps comprising treating a concentrate containing soybean sterols and impurities selected from the class consisting of other unsaponifiable organic matter, soap, oil, phosphatides, and pigmentary impurities with heated glacial acetic acid to dissolve the sterols and the impurities and cooling the solution to crystallize the sterols from solution.

5. In a process for recovering soybean sterols the steps comprising treating a soybean oil concentrate containing sterols and impurities with heated glacial acetic acid to dissolve the sterols and impurities and cooling the solution to crystallize the sterols from solution.

6. In a process for recovering soybean sterols the steps comprising taking up a liquid concentrate containing soybean sterols and impurities selected from the class consisting of other unsaponifiable organic matter, soap, oil, phosphatides, and pigmentary impurities in heated glacial acetic acid, cooling the solution thus formed to crystallize the sterols, separating the crystals from the mother liquor and washing the mixture of crystallized soybean sterols.

7. In a process for recovering soybean sterols the steps comprising taking up a liquid concentrated extract containing soybean sterols, and impurities selected from the class consisting of other unsaponifiable organic matter, soap, oil, phosphatides, and pigmentary impurities in heated glacial acetic acid, slowly cooling the solution to crystallize the sterols, separating the crystallized sterols from the mother liquor, and washing the mixture of crystallized soybean sterols.

8. In a process for recovering soybean sterols the steps comprising extracting soybean sterols from soybean material containing the same, concentrating the extract, taking up the concentrated extract in heated acetic acid of 75% to 100% concentration and cooling the thus formed solution to crystallize out the sterols.

9. In a process for recovering cottonseed sterols the steps comprising treating a concentrate of said sterols containing impurities selected from the class consisting of other unsaponifiable matter, soap, oil, phosphatides and pigment impurities with heated acetic acid of 75% to 100% concentration to dissolve the sterols and impurities, and cooling the thus formed solution to crystallize out the sterols.

10. In a process for recovering cottonseed sterols the steps comprising taking up a liquid concentrated extract containing said cottonseed sterols and impurities selected from the class consisting of other unsaponifiable matter, soap, oil, phosphatides, and pigment impurities in heated glacial acetic acid, and thereafter cooling the thus formed solution to crystallize the sterols therefrom.

11. In a process for recovering sterols the steps comprising treating a concentrate of said sterols containing impurities with acetic acid of 75% to 100% concentration to dissolve the sterols and impurities, and thereafter fractionally precipitating said sterols from the acetic acid solution.

PERCY L. JULIAN.
JOHN WAYNE COLE.